United States Patent
Kraft et al.

(10) Patent No.: US 10,760,490 B2
(45) Date of Patent: Sep. 1, 2020

(54) GAS TURBINE EFFICIENCY AND POWER AUGMENTATION SYSTEM'S MODULAR AIR COOLING SYSTEM AND METHODS OF USING THE SAME

(71) Applicant: PowerPHASE LLC, Jupiter, FL (US)

(72) Inventors: Robert J. Kraft, Tequesta, FL (US); Scott Auerbach, Jupiter, FL (US); Matthew Kraft, Jupiter, FL (US)

(73) Assignee: PowerPHASE LLC, Jupiter, FL (US)

( * ) Notice: Subject to any disclaimer, the term of this patent is extended or adjusted under 35 U.S.C. 154(b) by 189 days.

(21) Appl. No.: 15/460,969

(22) Filed: Mar. 16, 2017

(65) Prior Publication Data
US 2017/0268427 A1    Sep. 21, 2017

Related U.S. Application Data

(60) Provisional application No. 62/309,694, filed on Mar. 17, 2016.

(51) Int. Cl.
*F04D 29/58* (2006.01)
*F02C 7/143* (2006.01)

(52) U.S. Cl.
CPC .......... *F02C 7/143* (2013.01); *F04D 29/5826* (2013.01)

(58) Field of Classification Search
CPC . F04D 17/12; F04D 29/5826; F02C 7/12–185
See application file for complete search history.

(56) References Cited

U.S. PATENT DOCUMENTS

| | | | | |
|---|---|---|---|---|
| 5,362,207 A | * | 11/1994 | Martin | F04D 25/02 165/140 |
| 5,386,873 A | * | 2/1995 | Harden, III | B60K 11/04 165/140 |
| 5,718,563 A | * | 2/1998 | Hutchinson | F04B 39/066 165/299 |
| 6,447,264 B1 | * | 9/2002 | Lucas | F04B 39/0033 417/201 |
| 6,692,235 B2 | * | 2/2004 | Kolodziej | F04D 25/163 417/243 |
| 8,534,039 B1 | * | 9/2013 | Pierson | F02C 3/28 60/39.182 |
| 8,887,688 B1 | | 11/2014 | Neal et al. | |
| 2002/0174653 A1 | | 11/2002 | Uzkan | |
| 2007/0261682 A1 | * | 11/2007 | Smith | F02B 29/0443 123/563 |

(Continued)

FOREIGN PATENT DOCUMENTS

JP    61-223278 A    10/1986

OTHER PUBLICATIONS

International Search Report and Written Opinion dated Jul. 21, 2017, for International Application No. PCT/US17/22709, 17 pages.

*Primary Examiner* — Charles G Freay
*Assistant Examiner* — Thomas Fink
(74) *Attorney, Agent, or Firm* — Avant Law Group, LLC (57) ABSTRACT

The present invention discloses a novel modular cooling system for cooling an air injection system where the cooling system is configured to conform generally to the foot print of the air injection system. The cooling system utilizes a plurality of coolers through which coolant from the air injection system passes prior to being recirculated back to the air injection system.

8 Claims, 10 Drawing Sheets

(56) References Cited

U.S. PATENT DOCUMENTS

| | | | |
|---|---|---|---|
| 2007/0262283 A1* | 11/2007 | Onodera | F02D 41/0055 251/356 |
| 2008/0273991 A1 | 11/2008 | Kolodziej et al. | |
| 2010/0303658 A1 | 12/2010 | Ito et al. | |
| 2012/0180477 A1* | 7/2012 | Marsh | F01P 3/20 60/605.2 |
| 2014/0060074 A1 | 3/2014 | Macfarlane | |
| 2014/0366547 A1 | 12/2014 | Kraft et al. | |
| 2015/0007561 A1 | 1/2015 | Massano et al. | |
| 2015/0240719 A1* | 8/2015 | Kraft | F02C 6/00 290/52 |

\* cited by examiner

GAS TURBINE EFFICIENCY AND POWER AUGMENTATION SYSTEM'S MODULAR AIR COOLING SYSTEM AND METHODS OF USING THE SAME

CROSS-REFERENCE TO RELATED APPLICATIONS

This application claims priority to U.S. Provisional Patent Application Ser. No. 62/309,694 filed on Mar. 17, 2016, which is hereby incorporated by reference in its entirety.

TECHNICAL FIELD

This invention relates generally to electrical power systems, including generating, efficiency, and regulation capacity of a gas turbine, and more specifically to an air cooling system for cooling a continuous air injection power augmentation system.

BACKGROUND OF THE INVENTION

Currently, marginal energy, or peak energy, is produced mainly by gas turbine engines, operating either in a simple cycle or a combined cycle configuration. As a result of load demand profile, gas turbine engines are cycled up during periods of high demand and cycled down, or turned off, during periods of low demand. In many areas of the world, less efficient simple cycle gas turbine engines are used instead of more efficient combined cycle gas turbine engines. This is due to the lack of available water typically required for combined cycle plant operation and high peak loads. Furthermore, even in areas of the world with high demand for more power, simple cycle gas turbines are often used due to high fuel prices.

The Applicant has developed and produced an air injection system, commonly referred to as TurboPHASE®, which is capable of increasing the base load and peak load capacities of new and existing gas turbines while also improving efficiency. Applicant's air injection system, when applied to a fleet of gas turbines operating on liquid fuel would result in a fleet efficiency improvement of 3% during off peak periods and 5% during peak periods. However, one significant challenge for the air injection system is air cooling the system at power plants that do not have water.

The air injection system utilizes an internal cooling circuit for cooling the major components of the air injection system, including a fueled engine, an intercooled multistage compressor, and a lube oil system. Typically, a water glycol system cools each of the components with a dedicated heat exchanger that is internal to the air injection system. One challenge is to develop a cooling system for the air injection system that also works in hot climates, as traditional intercooled compressors utilize a water cooling system.

One key element of the air injection system is the modular nature of the system. The air injection system typically has a footprint, or occupying space, of a standard 40 foot shipping container or less, making it very easy logistically to install or move to an alternate location. Furthermore, the ancillary equipment required to support the air injection system, including air piping, air vent valves, air injection valves, recuperator, silencers, auxiliary air supply system and the gas fuel control system is typically mounted on the roof of the air injection system, so as to maintain the overall footprint of the system and its modular nature.

Applying air cooling systems to an intercooled compressor introduces challenges due to the low temperature desired by the intercooling process. As one skilled in the art can appreciate, the lower the coolant temperature available for intercooling a multistage compression process, the more efficient and less power the multistage intercooled compressor requires for the same air flow and pressure output. On a fueled engine, the coolant temperature on the hot side of the heat exchanger, inside the radiator, is typically about 200 degree Fahrenheit (deg. F.) and the air temperature outside, even in desert-type conditions is much cooler, resulting in a large thermal gradient to promote heat transfer to the air. Therefore, a radiator type cooling system for the engine works extremely well and is minimal size, even in extremely hot conditions. However, intercooling coolant temperatures are typically 80 deg. F. to 100 deg. F. and are typically cooled with water from open cooling towers or a natural water source such as from large water bodies like lakes, rivers or oceans. These water coolant sources are typically cooler than ambient air conditions, and even in extremely hot ambient conditions, can typically provide cooling sufficient to meet the 80 deg. F. to 100 deg. F. requirement. The maximum temperature of about 100 deg. F. is critical because this coolant is not only used to cool the interstage air as it is compressed, but it is typically used to cool the lube oil system in the compressor, which typically has a temperature limit of about 130 deg. F.

SUMMARY

The present invention provides several options, depending on specific plant needs, to improve the efficiency and power output of a plant at low loads, and to reduce the lower limit of power output capability of a gas turbine while also increasing the upper limit of the power output of the gas turbine, thus increasing the capacity and regulation capability of a new or existing gas turbine system.

One aspect of the present invention relates to methods and systems that allow an air injection power augmentation system for a gas turbine engine to provide additional power by utilizing an air cooled system.

Another aspect of the present invention relates to methods and systems that allow an air injection power augmentation system for a gas turbine engine to provide additional power utilizing a combined air cooled and chilling system.

Yet another aspect of the present invention relates to methods and systems that allow an air injection power augmentation system for a gas turbine engine to provide additional power by utilizing a combined air cooled and chilling system or a modular air cooled system.

In an embodiment of the present invention, a cooled compressed air generating system is provided comprising an intercooled compressor, a reciprocating engine powering the intercooled compressor system, and a multi-cooler air cooling system. The intercooled compressor system comprises a multi-stage compressor, an intercooler, and a lube oil system, while the multi-cooler air cooling system comprises coolers for the reciprocating engine and the intercooled compressor arranged in a parallel configuration.

In yet another embodiment of the present invention, an arrangement of compressed air systems and corresponding air cooling systems are provided where the compressed air systems are arranged in parallel with the corresponding air cooling systems also arranged in parallel, but spaced differently than the compressed air systems.

In another embodiment of the present invention, a cooled compressed air generating system is provided comprising an intercooled compressor, a driving mechanism for powering the intercooled compressor system, and a multi-cooler air cooling system. The intercooled compressor system comprises a multi-stage compressor, an intercooler, and a lube oil system, while the multi-cooler air cooling system comprises coolers for the driving mechanism and the intercooled compressor arranged in a parallel configuration.

In yet another embodiment of the present invention, a cooled compressed air generating system is provided comprising an intercooled compressor, a reciprocating engine powering the intercooled compressor system, and a multi-cooler air cooling system. The intercooled compressor system comprises a multi-stage compressor, an intercooler, and a lube oil system, while the multi-cooler air cooling system comprises coolers for the reciprocating engine and the intercooled compressor with at least one of the coolers for the reciprocating engine being in series with the cooler for the intercooled compressor.

The present invention provides an ability to increase the power output of the gas turbine engine with a supplemental air injection system that is cooled with ambient air, thereby eliminating the need for an external water cooling source.

The present invention also provides the ability to maintain a modular nature of the air injection system while providing a stand-alone air cooling system for the air injection system.

Yet another advantage of the present invention is the ability to maintain the same footprint of the air injection system while providing a stand-alone air cooling for the air injection system.

Another advantage of the present invention is the ability to control the coolant temperature to the compressor lube oil cooling system.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
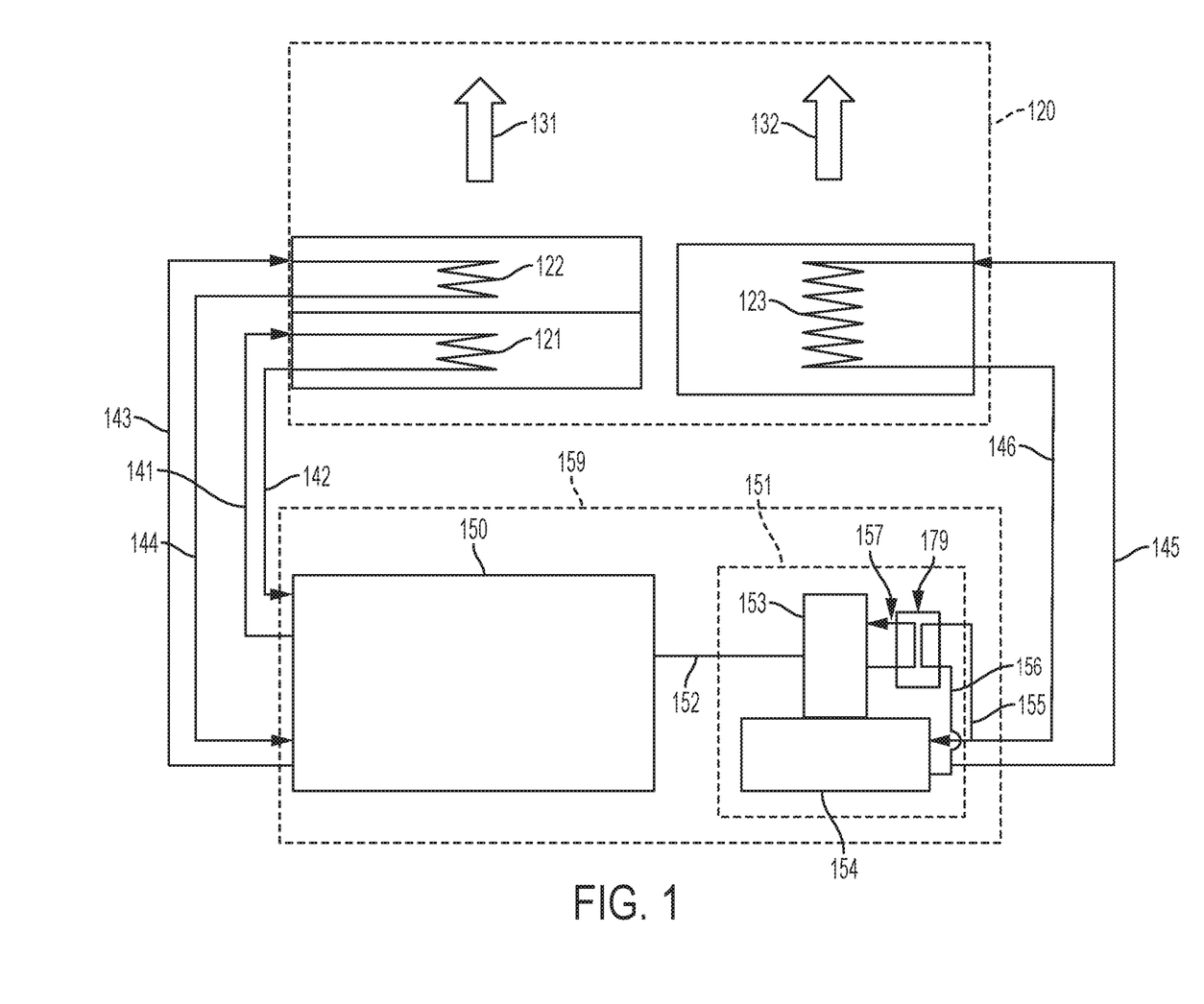
FIG. 1 is a schematic drawing of an embodiment of the present invention having a compressed air generating system with a fueled engine driving the air injection system, where the air injection system is air cooled through parallel cooling circuits.

The present invention will now be described with respect to FIGS. 1-10. Referring first to FIG. 1, a fuel driven air compression system 159 and an air cooling system 120 for cooling the fuel driven air compression system 159 are shown. The fuel driven air compression system 159 and the air cooling system 120 are configured to be used at a gas turbine plant for air injection power augmentation of the gas turbine engine.

The fuel driven air compression system 159, generally referred to in the industry as TurboPHASE®, comprises an engine 150 connected to an intercooled compressor 151 by way of shaft 152. The intercooled compressor 151 comprises three major systems, a compressor 153, an intercooler 154 that cools the air between stages of the compressor 153, and a compressor lube oil cooler 179. As one skilled in the art can appreciate, an electric motor could be used to drive the compressor 153.

The air cooling system 120 comprises three major components—a Low Temperature (LT) cooler 121, a High Temperature (HT) cooler 122, and the compressor intercooling water cooler 123. These three cooling circuits provide the necessary cooling for the intercooled compression system 159.

The engine 150, which can be a fueled engine, has a LT circuit to precondition the air within the engine to a specific temperature. This process is important for the engine 150 to maintain low emissions under a wide range of ambient conditions. The LT circuit consists of an LT cooler 121 that is supplied with a liquid coolant to be cooled through an LT supply line 141 from the engine 150. A fan 131 pulls air through the air cooling system 120 such that ambient air is passed over the LT cooler 121 and the liquid coolant is cooled by the air that is passed by the LT cooler 121 and then returned to the engine 150 through the LT return line 142. The LT cooling requirement is typically much less than and at a lower temperature (about 150 deg. F.) than the High Temperature (HT) circuit, and therefore is arranged upstream of the HT cooler 122.

In order to save space and eliminate the need for an additional fan, the HT cooler 122 is arranged in vertical orientation relative to the LT cooler 121. The HT cooler 122 is used to cool the engine jacket of the engine 150 and is at a much higher temperature, typically 200 deg. F. Although the air temperature increases after passing the LT cooler 121, there remains sufficient temperature differential between the cooling air that is being drawn across both coolers 121 and 122 with fan 131. Typically the LT cooler 121 rejects only about 5% or less of the heat transferred to the air in the combined LT and HT circuit, and therefore, the heat pick up by the air as it passes across the LT cooler 121 is typically on the order of about 1-2 deg. F. The HT circuit receives the hot coolant from the engine 150 via HT supply line 143 and then the HT cooler 122 cools the liquid coolant with the air that is drawn across the HT cooler 122 by fan 131. The cooled HT coolant is returned to the engine 150 through the HT return line 144. In an embodiment of the present invention, both the HT and LT coolers 121 and 122 are radiator style heat exchangers.

The compressor intercooling water cooler 123 (CIC) provides critical coolant to the major systems of the intercooled compression system 159 including the intercoolers 154, which cool the air between the stages of the compressor 153, and lube oil cooler 179 which cools the oil that is used for lubrication of the compressor 153 as well as other possible oil systems. For example, other equipment requiring lubrication includes a gear box (not shown) between the engine 150 and the compressor 153. Also, the lube oil system 179 is integrated in series with a compressor lube oil system, and as such, the lube oil cooling system 179 discussed herein would cool the lube oil for both the compressor 153 and the gear box (not shown). The CIC 123 receives the hot liquid coolant via supply line 145 from the compressor coolant discharge manifold 156 and passes it through the CIC 123. Air is drawn across the CIC 123 by a CIC fan 132 and the fluid in the CIC 123 is cooled and returned via the compressor coolant return line 146 and return manifold 155. The compressor coolant return manifold 155 supplies the cooled coolant to the lube oil cooler 179 and the intercooler 154. One or more coolant throttling valves (not shown) can be used to adjust the amount of flow that goes to the lube oil cooler 179 and the intercoolers 154. Similarly, and for maintenance purposes, one or more coolant isolation and drain valves (not shown) can be used to drain or isolate the lube oil cooler 179 and the intercoolers 154. The hot lube oil is pumped to the lube oil cooler 179 where it is cooled with the coolant from the return line 146. The lube oil is then returned to the compressor 153 via return line 157 where it is heated from operation of the compressor 153. The lube oil system may also contain a mechanical pump driven by the air compressor and an electric backup lube oil pump to circulate the lube oil through the system (both pumps not shown).

Figure 5:
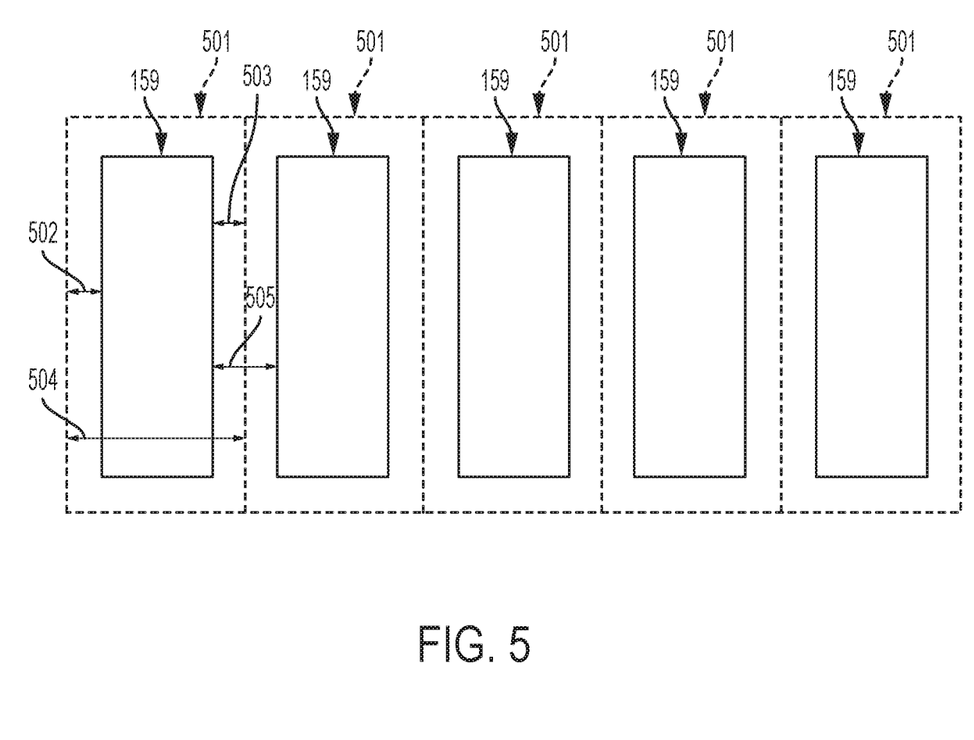
FIG. 5 is a schematic drawing of an embodiment of the present invention depicting a layout of a series of air injection systems and associated cooling systems with a fueled engine driving the supplemental compressor that is air cooled where the air cooler is arranged in a modular fashion above the compressed air generating system such that multiple systems can be located adjacent to each other.

Through the arrangement discussed above, the three coolers 121, 122, and 123, can also be sized and laid out as shown in FIG. 5, where the intercooled compressor system 159 has a footprint, as shown in a top elevation view in FIG. 5, such that multiple systems can be arranged next to each other in a modular fashion. The modularity of the air compression systems has many benefits including that each system is capable of being operated and cooled independently such that if there were multiple air compression systems at a site and there was a problem with the cooling system, not all the air compression systems would be affected. Also, because the compressed air generating system is modular, they can be moved easily without affecting the balance of plant equipment. The cooling system 501 has a total width 504 based on the width of the intercooled compressor system 159 and a left overhang 502 and a right overhang 503. The total width 504 of the system dictates the minimum spacing 505 between the intercooled compressor systems 159. This spacing is a critical parameter in gas turbine power plants which are often space constrained. For example, in environments where space is at a premium, cooling air systems may need to be stacked on top of each other, where the first floor of the cooling air system is on a cement foundation and a second floor of cooling air systems are on a steel structure. In this case, the HT and LT coolers and the compressor intercooler water cooler are arranged above the cooling air systems and can be arranged in a number of layouts to retain the modularity of the system. Alternately, if a permanent system is desired and the modularity is not required, one LT, HT and intercooler circuit could be used to cool all of the fuel-driven air compression systems.

Figure 2:
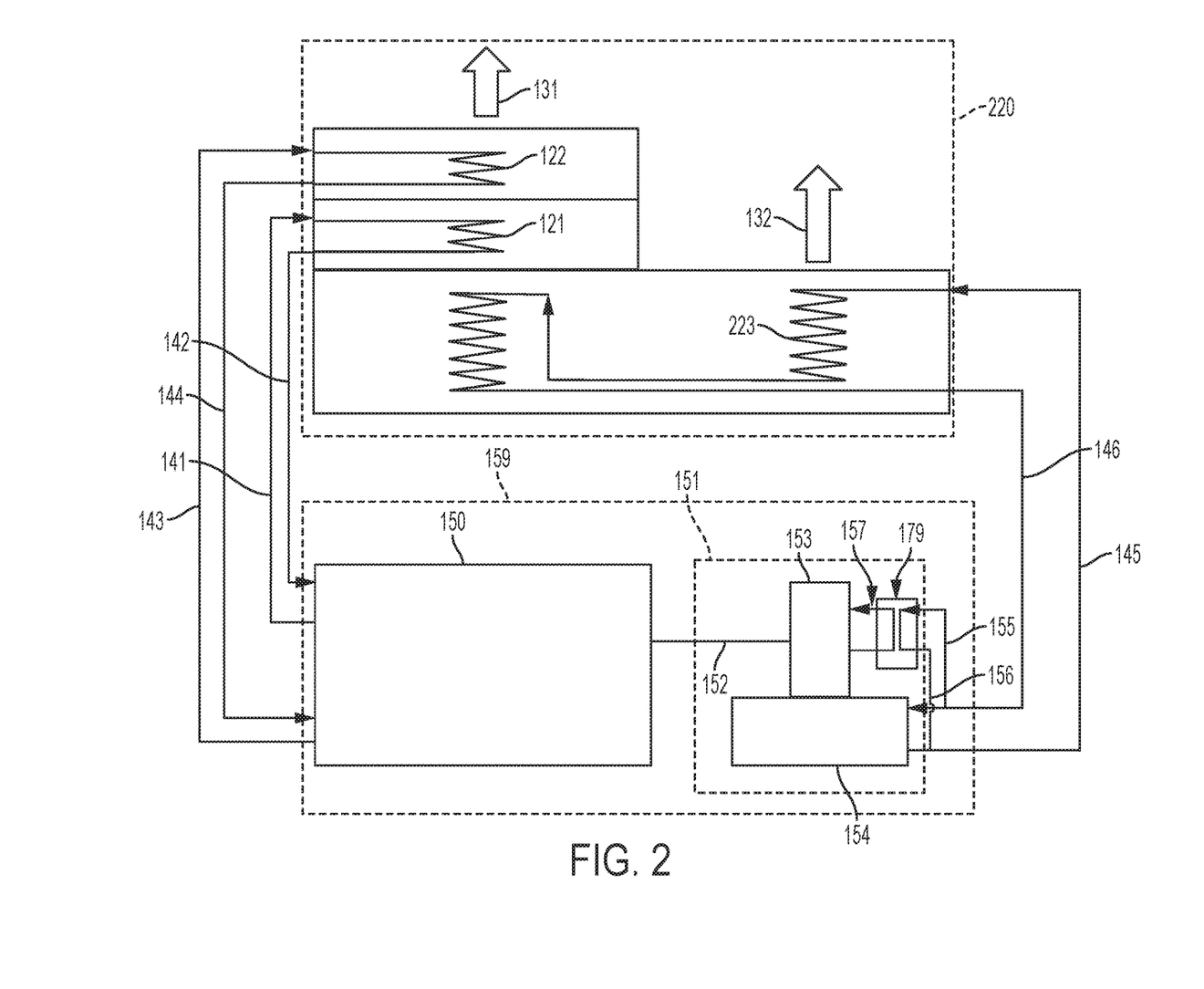
FIG. 2 is a schematic drawing of an embodiment of the present invention having a compressed air generating system having a fueled engine driving the air injection system, where the air injection system is cooled in a series of circuits.

Referring now to FIG. 2, an alternate layout for the compressed air generating system is shown, where the compressor intercooling cooler 223 is increased in size compared to that of the embodiment in FIG. 1. This configuration may be required where minimal spacing between air compression systems exists or in cases of high ambient air temperatures where the compressor intercooling cooler 223 has to be increased in size. As shown in FIG. 2, the larger compressor intercooling cooler 223 is arranged such that the cooling air being drawn by fan 131 across the LT cooler 121 and HT cooler 122 circuit (for cooling the engine 150) provides additional cooling to the compressor intercooling cooler 223. Alternately (not shown), depending on the expected LT cooler load and coolant temperature, the compressor intercooling cooler 223 could be arranged such that the cooling air being drawn by fan 131 across the LT 121 and HT 122 circuits first provides cooling to the LT cooler 121 and then cooling to the compressor intercooling cooler 223.

Figure 3:
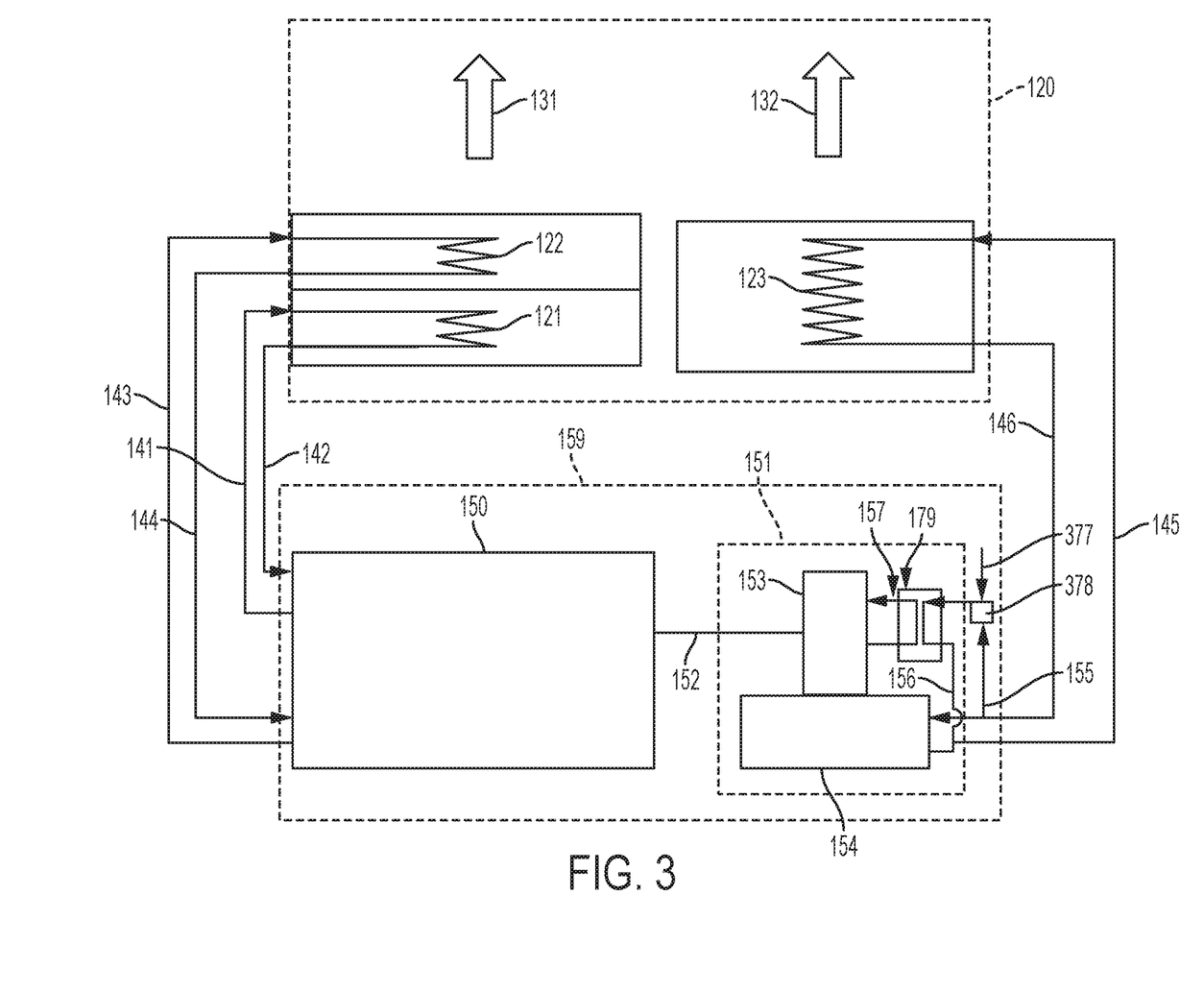
FIG. 3 is a schematic drawing of an embodiment of the present invention having a compressed air generating system with a fueled engine driving the air injection system which is air cooled with the engine and compressor cooling circuits arranged in parallel.

Referring now to FIG. 3, independent of the physical arrangement discussed above, it may be necessary or desirable to further cool the lube oil system for the compressor 153. FIG. 3 shows an additional lube oil cooler 378 that can be driven by a source of electrical or mechanical power 377 from the engine or compressor drive train. Here, the additional lube oil cooler 378 adds additional cooling to the cooling fluid from supply line 146 being supplied from the air cooler or directly to the oil itself (not shown).

Figure 4:
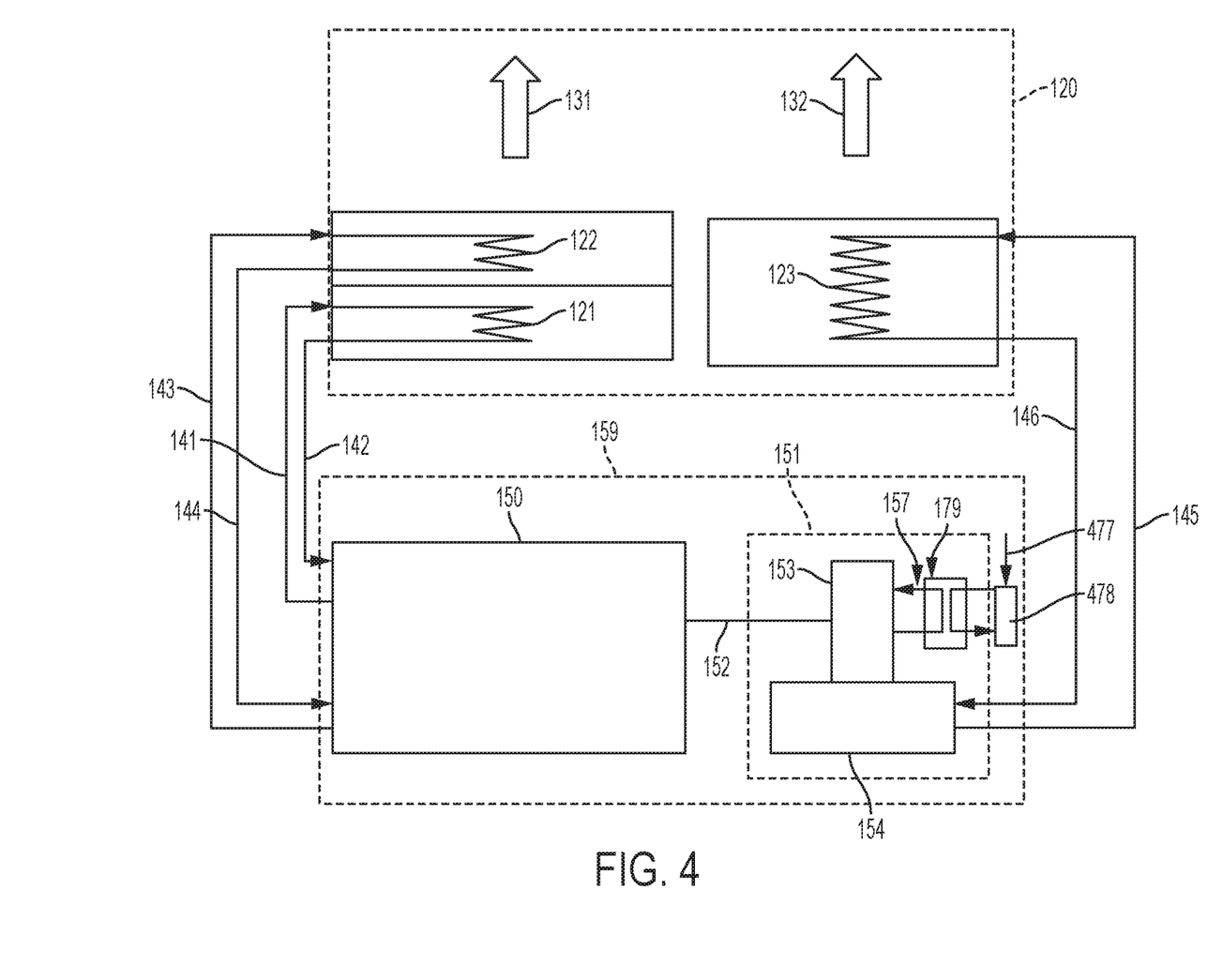
FIG. 4 is a schematic drawing of an embodiment of the present invention having a compressed air generating system driven by a fueled engine and which is air cooled with the engine and compressor cooling circuits being in parallel and the compressor lube oil cooling circuit is accomplished with an auxiliary cooler.

Alternately, and as shown in FIG. 4, the lube oil cooler 179 can be cooled with a separate cooling system 478 driven by a source of electrical or mechanical power 477 from the engine or compressor train.

Figure 6:
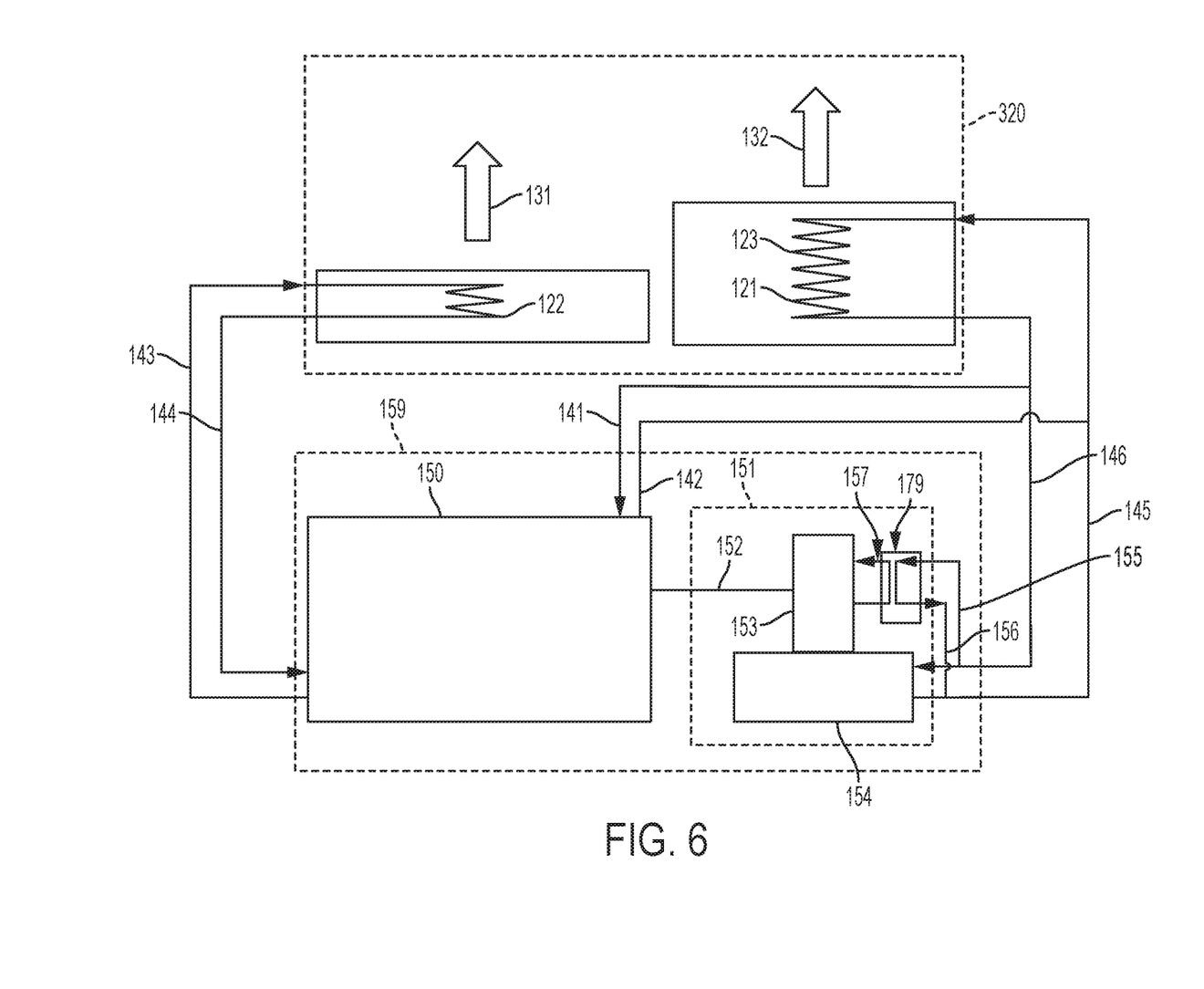
FIG. 6 is a schematic drawing of an embodiment of the present invention in which a cooling circuit for the engine and the multi-stage compressor pass through a common circuit.

Referring now to FIG. 6, an alternate embodiment of the present invention is disclosed in which CIC 123 and LT cooler 121 from the jacket of engine 150 are combined in series and positioned adjacent the HT cooler 122. Hot coolant from the engine jacket combines with coolant from the intercooler 154 and lube oil system 179 in a supply line 145. This coolant passes through the coolers 121 and 123 before it is returned to the engine jacket via return line 141 and to the intercooled compressor and lube system via return line 146.

Figure 7:
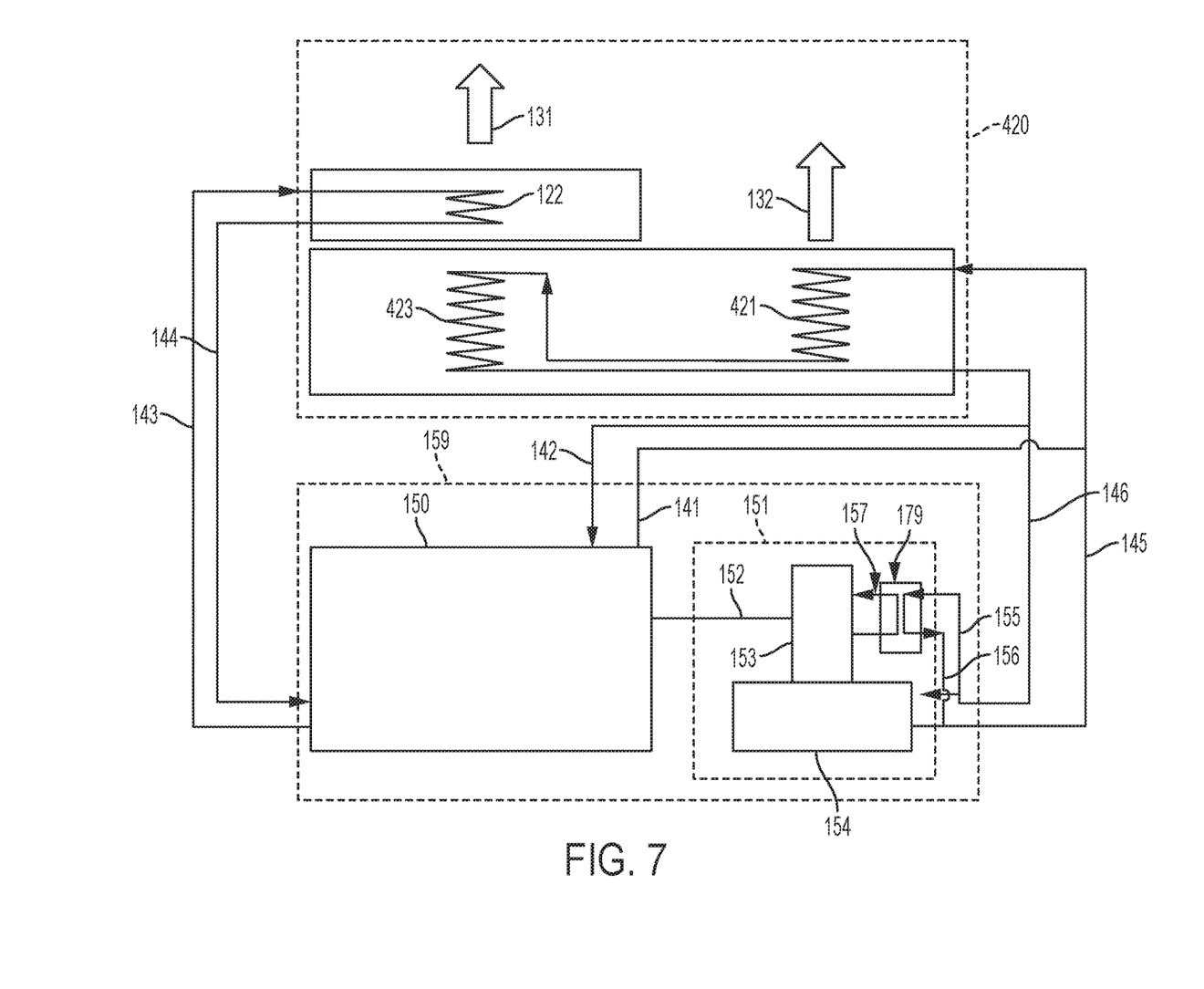
FIG. 7 is a schematic drawing of an embodiment of the present invention in which a cooling circuit for the engine and the multi-stage compressor operate in parallel.

A slightly different physical arrangement of the present invention is depicted in FIG. 7. In this embodiment of the present invention, an air cooling system 420 comprises a LT cooler 421, an HT cooler 122, and a compressor intercooling cooler 423, where the LT cooler 421 and compressor intercooling cooler 423 are in series. The HT cooler 122 is positioned vertically above the other coolers in air cooling system 420, similar to that of the embodiment in FIG. 1.

Figure 8:
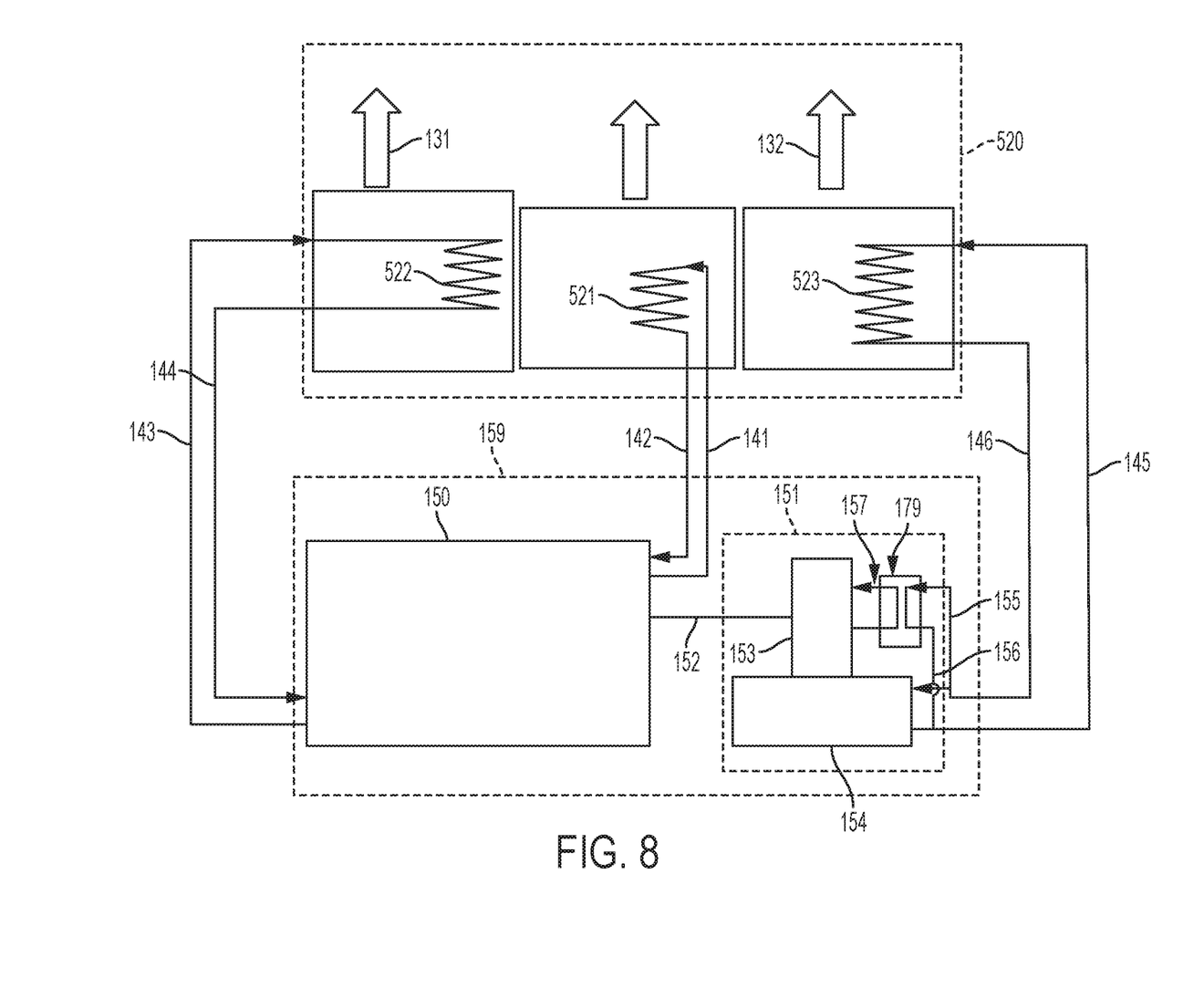
FIG. 8 is a schematic drawing of an embodiment of the present invention in which the cooling circuits for the engine and the multi-stage compressor are in parallel.

Referring now to FIG. 8, an alternate embodiment of the present invention is depicted. In this embodiment of the present invention, the three coolers 521, 522, and 523 used for cooling coolant for the jacket of the engine 150 and the intercooled compressor 151 are located adjacent to each other and above the air compression system 159. In the configuration shown in FIG. 8, each of the coolers 521, 522, and 523 operate in parallel with their respective supply and return lines for coolant flow.

Figure 9:
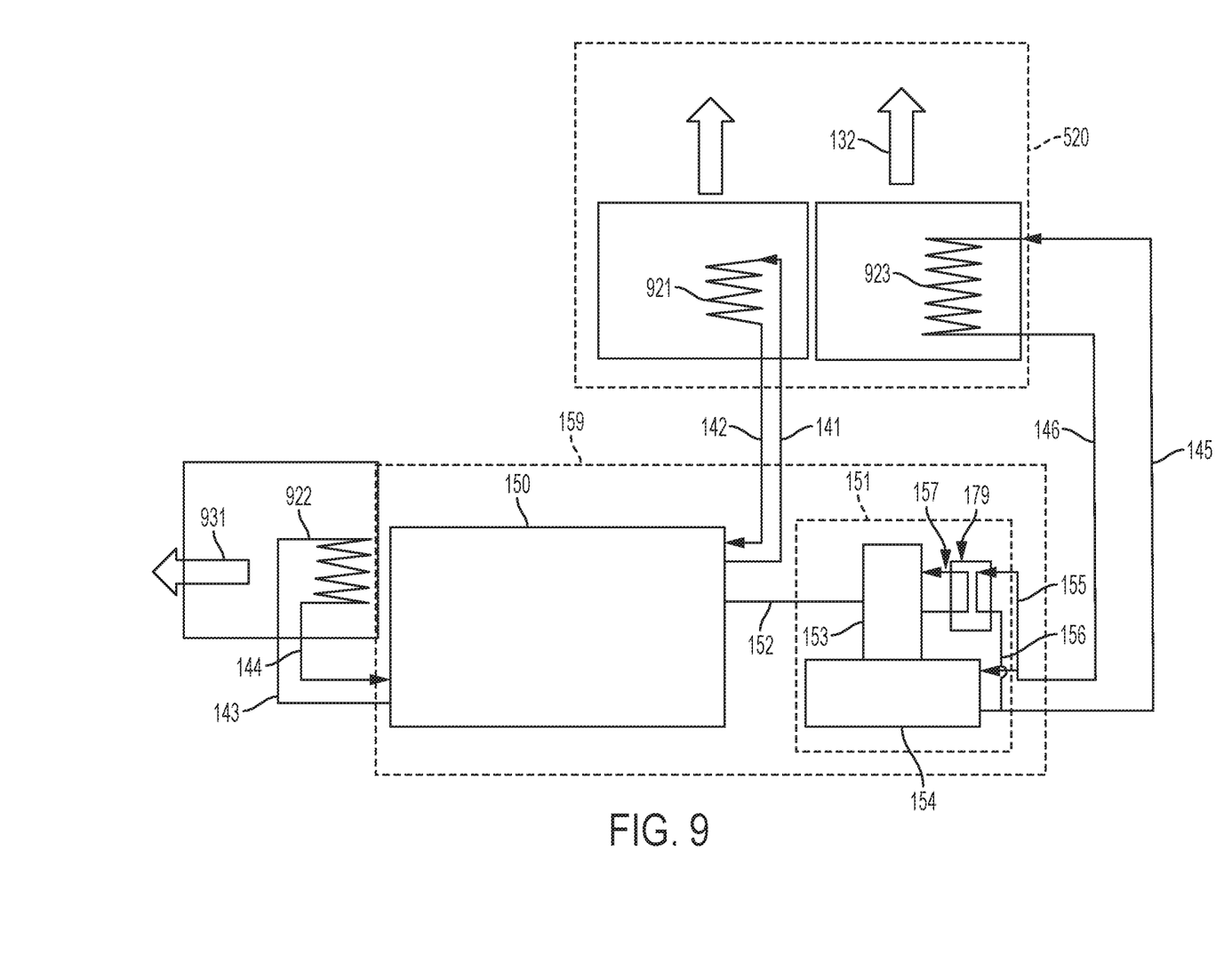
FIG. 9 is a schematic drawing of an embodiment of the present invention in which the cooling circuits for an engine high temperature circuit and multi-stage compressor are in parallel while the engine low temperature circuit is cooled with compartment ventilation air.

Referring now to FIG. 9, an alternate embodiment of the present invention is disclosed. In this embodiment of the present invention, the CIC and HT engine coolers, 923 and 921 respectively, are depicted where the HT engine cooler 921 is used for cooling the coolant for the jacket of the engine 150. The two coolers, HT engine 921 and CIC 923 are located adjacent to each other and vertically above the intercooled compression system 159 with the LT cooler 922 utilizing compartment vent air 931, either on the inlet side of the intercooled compression system 159 or the exhaust side of the compartment to cool the LT engine cooling circuit. In the configuration shown in FIG. 9, each of the coolers 921, 922, and 923 operate in parallel and independent with their respective supply and return lines for coolant flow. One element of this particular cooling configuration is that when the LT cooler 922 is implemented as shown, this configuration can be used independent of HT cooler 921 and the compressor intercooler 923. This is significant because it allows commonality between the coolers. For example, if the circuits for HT cooler and compressor intercooler were utilizing plant water for coolant, then the LT cooler 922 could still be as shown in FIG. 9, which drives commonality and cost reduction in the packaging of the intercooled compression system 159.

Figure 10:
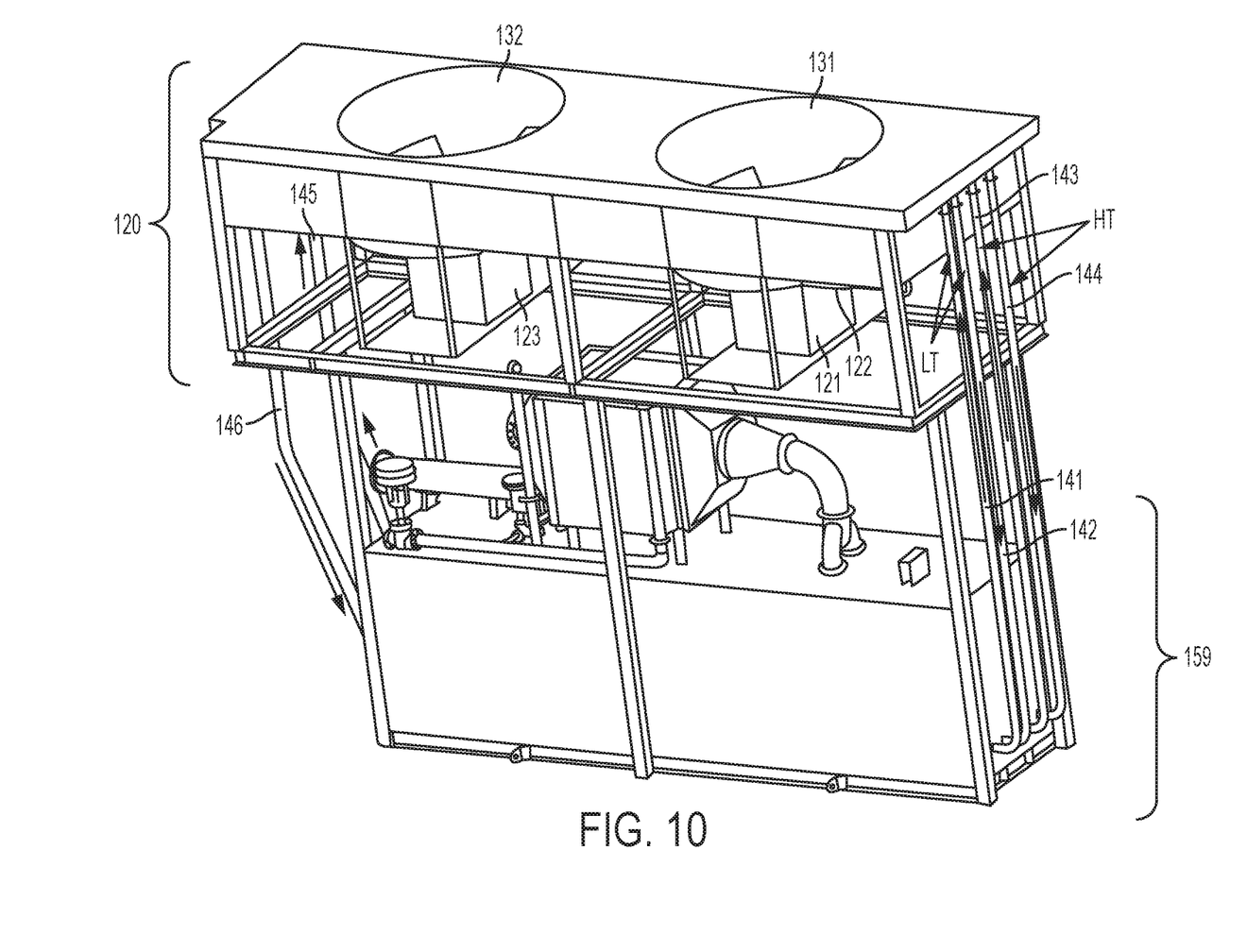
FIG. 10 is a perspective view of an embodiment of the present invention.

FIG. 10 depicts a perspective view of an embodiment of the present invention. More specifically, an intercooled compressor system 159 is positioned in the lower portion of FIG. 9. The intercooled compressor system 159, which includes an intercooled compressor driven by a fueled engine, is contained within the container depicted in FIG. 9. Positioned above the intercooled compressor system 159 is the air cooling system 120 comprising the LT cooler 121, HT cooler 122, compressor intercooling cooler 123, and fans 131 and 132 which draw air across the coolers 121, 122, and 123. Also depicted in FIG. 10 is the series of supply and return lines for the coolant flow passing between intercooled compressor system 159 and the air cooling system 120, as indicated by the arrows in FIG. 10.

Although a preferred embodiment of this invention has been disclosed, a worker of ordinary skill in this art would recognize that certain modifications would come within the scope of this invention. For that reason, the following claims should be studied to determine the true scope and content of this invention. Since many possible embodiments may be made of the invention without departing from the scope thereof, it is to be understood that all matter herein set forth or shown in the accompanying drawings is to be interpreted as illustrative and not in a limiting sense.

From the foregoing, it will be seen that this invention is one well adapted to attain all the ends and objects herein above set forth together with other advantages which are obvious and which are inherent to the structure.

It will be understood that certain features and sub-combinations are of utility and may be employed without reference to other features and sub-combinations. This is contemplated by and is within the scope of the claims.

The invention claimed is:

1. A cooled compressed air generating system comprising:
   an intercooled compressor system having:
      a multi-stage compressor;
      an intercooler in fluid communication with the multi-stage compressor; and,
      a lube oil system;
   a reciprocating engine powering the intercooled compressor system; and,
   a multi-cooler air cooling system in fluid communication with and vertically above each of the reciprocating engine and the intercooled compressor system, the multi-cooler air cooling system having a high temperature cooler, a low temperature cooler, and a compressor cooler; the low temperature cooler preconditioning air within the reciprocating engine and being located upstream of the high temperature cooler; the high temperature cooler cooling an engine jacket of the reciprocating engine; the compressor cooler cooling each of the intercooler and the lube oil system;
   a first fan above and associated with each of the high temperature cooler and the low temperature cooler;
   a second fan adjacent the first fan and above and associated with the compressor cooler;
   wherein, the low temperature cooler is located below the high temperature cooler and is parallel to the compressor cooler.

2. The system of claim 1, coupled to a gas turbine engine for power augmentation.

3. The system of claim 1, further comprising a compressor coolant return manifold to supply coolant to the lube oil system and the intercooler.

4. The system of claim 3, wherein a volume of coolant that goes to the lube oil system and the intercooler is adjustable.

5. The system of claim 3, further comprising a first set of lines, the first set of lines comprising a supply line and a return line for the low temperature cooler.

6. The system of claim 5 wherein each of the supply line and the return line extend generally vertically.

7. The system of claim 5, further comprising a second set of lines, the second set of lines comprising a supply line and a return line for the high temperature cooler.

8. The system of claim 7, wherein the first set of lines is adjacent the second set of lines.

* * * * *